Patented Nov. 29, 1927.

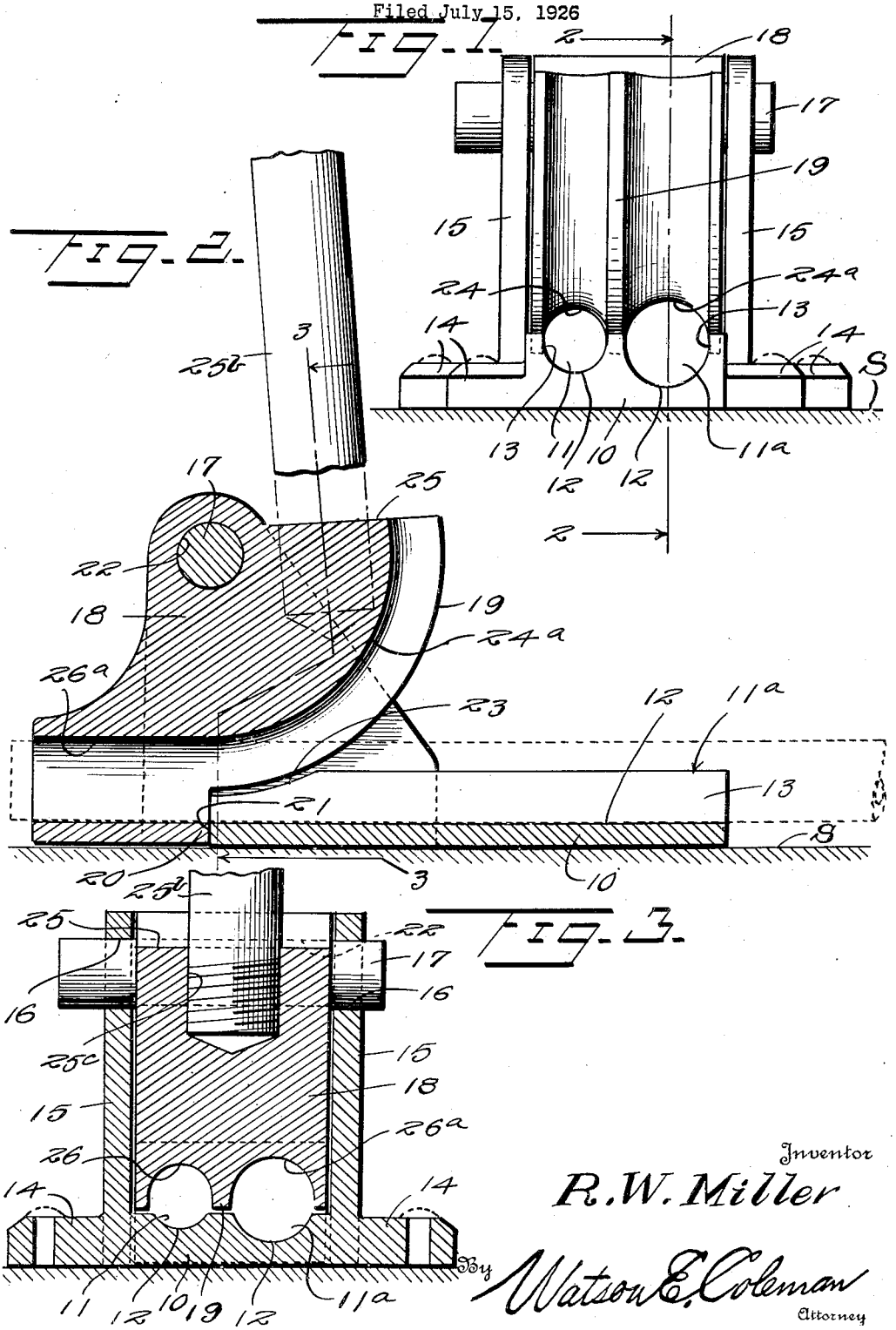

1,650,955

UNITED STATES PATENT OFFICE.

RICHARD W. MILLER, OF MILWAUKEE, WISCONSIN.

PIPE BENDER.

Application filed July 15, 1926. Serial No. 122,702.

This invention relates to pipe benders and more particularly to a device for use in hand bending, small electrical conduit or pipe on the job.

An important object of the invention is to provide a device of this character which includes means gripping the pipe to draw the same for the bending operation, which is operable without the necessity of adjusting any clamping mechanism or similar structure.

A still further object of the invention is to provide a structure of this character which will prevent flattening of the pipe at the bend.

A still further object of the invention is to provide a device of this character which may be very readily and cheaply produced, which will be durable and efficient in service and in which a single tool will suffice for the making of all bends which are ordinarily made on the job by electricians.

These and other objects I attain by the construction shown in the accompanying drawings, wherein for the purpose of illustration is shown a preferred embodiment of my invention and wherein:—

Figure 1 is an end elevation of a pipe bender constructed in accordance with my invention, the handle being removed;

Figure 2 is a section on the line 2—2 of Figure 1, the position of the handle being indicated in dotted lines;

Figure 3 is a section on the line 3—3 of Figure 2.

Referring now more particularly to the drawings, the numeral 10 indicates a base, the upper surface of which is formed with a pair of longitudinally extending grooves 11 and 11ª. While a pair of grooves is illustrated, a greater number may be provided, if so desired, one groove being provided for each diameter of pipe which is to be bent by the bender. Each groove has its bottom 12 curved to conform to the curvature of the pipe which is to be bent and its side walls 13 spaced apart a distance equal to the diameter of the pipe. The depth of each groove 11 or 11ª is made slightly greater than one-half the diameter of the pipe which is to be accommodated. Projecting from the side faces of the base are attaching ears 14 having openings for the passage of securing elements whereby the base may be secured to a suitable support S, and at one end the base is formed with a pair of upstanding standards 15 which, in vertical alignment with this end of the base, are provided with openings 16.

Through the openings 16 a shaft 17 is directed and upon this shaft, intermediate the standards 15, is mounted a block 18 having a portion of its face arcuately curved, as at 19, and the second portion of its face, indicated at 20, constructed to abut against the end wall 21 of the base when the block is in one position with relation thereto. The curved wall 19 is curved with the axis of the opening 22 which receives the shaft 17 as a center and with a radius slightly greater than the distance between the axis of the shaft 17 and the adjacent surface of the base 10. The upper surface of the base at this end is relieved or cut away at 23, so that the curved face 19 operates in close proximity thereto.

The arcuate face 19 is grooved with grooves 24 and 24ª corresponding to and aligning with the grooves 11 and 11ª. These grooves, in common with the grooves 11 and 11ª, have the same width as the diameter of the pipe which is to be accommodated, are of slightly greater depth than one-half the diameter of the pipe and have their bottoms curved to conform to the curvature of the pipe. At the opposite end of the curved face upon the end thereof provided with the outwardly radially extending shoulder 20, the face of the block terminates in a radially directed face 25 formed with a socket 25ª threaded for the reception of a piece of pipe providing a handle 25ᵇ whereby the block 18 may be rotated. The shoulder 20 is pierced by bores 26 and 26ª corresponding to the grooves 24 and 24ª and each of a diameter equal to the diameter of the pipe which is to be accommodated. These bores are tangential to the bottoms of the grooves 24 and 24ª and when the shoulder 20 abuts the end 21 of the base provide continuations of the grooves 11 and 11ª formed in the base. When the block 18 is mounted upon the shaft 17, the grooves 24 and 24ª thereof coact with the grooves 11 and 11ª of the base at the end 21 thereof to produce a circular opening of the same diameter as the pipe which is to be bent, as more clearly shown in Figure 3. By making the grooves 11 and 11ª and 24 and 24ª of slightly greater depth than one-half the diameter of the pipe which is to be treated, it is assured that flattening of the pipe will not take place at either side of the point at which the grooves combine to produce a circular opening of the same diameter as the pipe. In making a bend, it is simply necessary to insert the pipe through the proper groove 11 or 11ª and through the associated bore 26 or 26ª. The handle 25ᵇ is then grasped and rotated. The initial bending movement will cause the wall of the bore 26 or 26ª to grasp a pipe, so that the pipe is drawn through the groove 11 or 11ª to be formed with the bend. As that section of the pipe, which is within the bore 26, will remain straight, it will, of course, be obvious that a very secure clamping action will be provided, preventing slipping of the pipe during the bending action. The bent portion of the pipe will lie within the groove 24 or 24ª of the block 18 and the strain placed thereon may not flatten the formed bend, because of the fact that the pipe cannot widen transversely as is necessary to a flattening operation, as would be possible with the grooves of a depth merely equal to one-half the diameter of the conduit. The same function is performed by the grooves 11 and 11ª, although the tendency to flattening within these grooves is not so great and these grooves can be made of the ordinary construction for handling certain grades of pipe.

Since the construction hereinbefore set forth is obviously capable of a certain range of change and modification without materially departing from the spirit of the invention, I do not limit myself to such specific structure except as hereinafter claimed.

I claim:—

A pipe bender comprising stationary and rotatable parts having confronting working faces, the working face of the rotatable part being curved, said curved portion having a groove, said rotatable part having a portion located at the end of the curved portion thereof and provided with a bore meeting said groove at a tangent, the stationary part having a groove, the grooves of the stationary and rotatable parts being each of the same width as the diameter of the pipe to be bent and of a depth slightly greater than one-half of the diameter of the pipe, the working face of the stationary part being cut away at one end to permit approach of the working face of the rotatable part to a point where the bottoms of the grooves of the rotatable and stationary parts are spaced apart equal to the diameter of the pipe.

In testimony whereof I hereunto affix my signature.

RICHARD W. MILLER.